Oct. 16, 1962 G. WADE 3,059,138

MODULATION EXPANDER AND COUPLER FOR PARAMETRIC AMPLIFIERS

Filed Sept. 11, 1959

INVENTOR
Glen Wade
BY Francis W. Crotty
ATTORNEY

United States Patent Office 3,059,138

Patented Oct. 16, 1962

3,059,138

MODULATION EXPANDER AND COUPLER FOR PARAMETRIC AMPLIFIERS

Glen Wade, Menlo Park, Calif., assignor to Zenith Radio Corporation, a corporation of Delaware Filed Sept. 11, 1959, Ser. No. 839,352

6 Claims. (Cl. 315—3)

The present invention is directed to transverse-mode parametric amplifiers of the quadrupole type and concerns in particular a combined signal coupler and modulation expander for such an amplifier. The invention is a further development of the quadrupole parametric amplifier described and claimed in copending application Serial No. 747,764, filed July 10, 1958, in the name of Glen Wade and assigned to the assignee of the present invention.

In a transverse-mode parametric amplifier the electron beam is projected along a predetermined path which terminates in a collector for receiving the beam. The electrons in the beam, when subjected to the restoring force of a focusing field, oscillate about their respective rest positions at a frequency referred to as the transverse resonant frequency or, for the usual case wherein the focusing results from a magnetic field, as the cyclotron frequency. The electron motion of a beam in which electron resonance has been established may be modified in response to an applied signal to effect modulation of the beam by that signal. Accordingly, it is the usual practice to position an input coupler along the beam path adjacent the electron source for the purpose of modulating the beam with a signal to be amplified.

Amplification is accomplished by expanding the electron motion of the beam representing the signal that it conveys and this expansion is achieved by subjecting the signal-modulated beam to a non-homogeneous pumping field, the energy required for the amplification being delivered by a pump signal source employed for creating the non-homogeneous field. For the quadrupole type of amplifier, the pumping field is created by a symmetrical quadrupole electrode structure as described in the afore-identified application.

After amplification in the modulation expander, the signal carried by the beam is extracted by means of an output coupler which, in the usual case, is the same type of structure employed for modulating the beam with the signal to be amplified. In other words, the signal coupler has bi-directional properties and is employed ahead of the modulation expander for the purpose of impressing a signal on the beam and is utilized after the expander to demodulate or extract the amplified signal from the beam.

Thus, as generally constructed, the quadrupole type of parametric amplifier has three distinct and independent components positioned along the beam path, these being the input modulator or coupler, the modulation expander and the output coupler or demodulator arranged in the recited order. The improvement of this invention features a combination of certain of these components into a single structural part for the purpose of simplifying the amplifier.

Accordingly, it is an object of the invention to provide a transverse-mode parametric amplifier of the quadrupole type having a simplified construction as respects the modulation expander and signal coupler.

It is a particular object of the invention to provide a combined signal coupler and modulation expander for use in a transverse-mode parametric amplifier of the quadrupole type.

A combined signal coupler and modulation expander constructed in accordance with the invention for use in a transverse-mode parametric amplifier of the quadrupole type comprises a transmission line disposed coaxially of an electron beam path and including four conductors arranged in two mutually perpendicular pairs. Means, including a signal circuit, are coupled to at least two of those conductors for establishing a transverse dipole field across the beam path in response to signal energy transferred between the beam and the signal circuit. Further means, including a pump signal source, are coupled to both pairs of the conductors for establishing a symmetrical quadrupole field about the beam path in response to a pumping signal applied from the pump signal source.

The features of this invention which are believed to be novel are set forth with particularity in the appended claims. The organization and manner of operation of the invention, together with further objects and advantages thereof, may best be understood with reference to the following description taken in conjunction with the accompanying drawings, in which like reference numerals refer to like elements in the several figures, and in which:

The theory of operation and structural details of a quadrupole type transverse-mode parametric amplifier are fully described in the afore-identified application which is incorporated herein by reference. In particular, the operation of a symmetrical quadrupole electrode structure in generating a non-homogeneous pumping field and its operative effect on the electrons of a signal modulated beam to expand their orbital motion and accomplish amplification of the signal they represent is developed completely in that application and will therefore be referred to herein only in brief summary. The function of the quadrupole field in achieving its purpose of expanding the electron orbit is essentially the same in the modulation expander to be described herein as it is with the transmission-line form of quadrupole modulation expander illustrated and described in that application. Moreover, the representative structural arrangements of a quadrupole type parametric amplifier disclosed in the earlier-filed case are generally applicable in constructing physical embodiments of the device to be described. Accordingly, the representations of the figures annexed hereto are schematic and the structural description as well as mode of operation will be considered in much less detail in this text than in the reference application.

Figure 1:
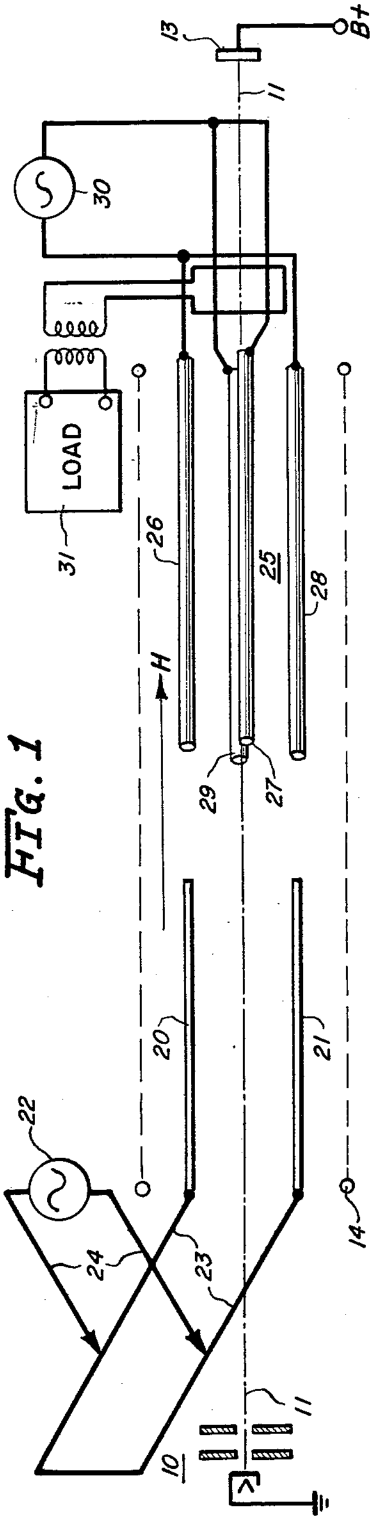
FIGURE 1 is a schematic representation of a parametric amplifier embodying the present invention.

Referring now more particularly to FIGURE 1, the amplifying system there represented comprises an electron source 10 for projecting an electron beam along a predetermined path designated by construction line 11, 11. The electron source may be entirely conventional and preferably includes the usual cathode together with suitable focusing and accelerating electrodes for developing a well-defined beam or stream of electrons. Path 11 terminates in an electron collector or anode 13 disposed transversely of the path and biased at a suitable positive potential as indicated by the symbol B+.

The amplifier has means for creating in the beam path a field for establishing transverse electron resonance in the beam transversing that path. While electron resonance may be established through the agency of a magnetic or an electric field, the arrangement under consideration employs a solenoid 14 surrounding the beam path throughout most of its length to establish lines of magnetic flux parallel thereto and of a strength to establish a selected cyclotron frequency for electron motion. The focusing field of the solenoid is indicated symbolically by the arrow H.

As described above, it has been the practice in the past to position a modulator or input coupler, a modulation expander and demodulator or output coupler in the recited order at spaced points along the beam path and the subject invention is directed to combining certain of these components. Where the components are separate and distinct from one another, the amplifier is unconditionally stable because there is no coupling from the output to the input coupler. This is a most desirable property of the device and is preserved in the structure represented in FIGURE 1 through the expedient of combining the modulation expander with one of the couplers while utilizing a separate and distinct structure for the other coupler. In principle, both couplers may be combined with the modulation expander but, for the reasons stated, the input coupler or modulator is shown as a separate structure in FIGURE 1.

The function of the input coupler is to modulate the electron beam in response to an applied signal frequency and the device may take any of a variety of forms, either the lumped or distributed type. As represented, it comprises a pair of deflectors 20, 21 positioned on opposite sides of the beam path. The deflectors are coupled to a signal source 22 by means of a transmission line 23 and a transmission link 24. Transmission line 23 is short-circuited at one end and coupled at its opposite end to the deflectors. Transmission link 24 is tapped onto transmission line 23 to match the impedance of source 22 to that presented by deflectors 20, 21. Transmission line 23, together with deflectors 20, 21, has an effective electrical length corresponding to one quarter wave length at the freqency of the signal supplied by source 22 for amplification; the effective electrical length may also be increased by integral multiples of one half wave length. The input coupler is positioned within the focusing field established by solenoid 14.

Following input coupler 20, 21 is a single structure 25 serving as a combined signal coupler and modulation expander. It comprises a transmission line disposed coaxially of beam path 11 and including four conductors 26–29 arranged in two mutually perpendicular pairs 26—28 and 27—29. This structure is likewise positioned within the field of solenoid 14.

To have this structure perform the functions of modulation expansion and signal transfer in respect of the beam, there are provided means coupled to both pairs of its conductors for establishing a symmetrical quadrupole field about the beam path in response to a pumping signal and further means coupled to at least two of those conductors for establishing a transverse dipole field across the beam path in response to a signal applied from an external source. This coupling arrangement, while represented schematically in FIGURE 1, is most clearly understood from FIGURE 2 where numeral 30 represents an external pump signal source and transformer 31 represents a signal circuit. The coupling arrangement is useful whether the circuit 31 be the load to be supplied with the amplified signal, which is the case specifically represented in FIGURE 1, or whether it be the source of the signal to be amplified which would be the case were structure 25 a combination of the modulation expander and the input coupler as distinguished from a combination including the output signal coupler. As already indicated, the coupling devices have bi-directional or reciprocal properties, functioning in essentially the same way in transferring signal energy from the beam to a load or from a signal source to the beam. For purposes of this description, it is convenient to describe the field conditions established when a signal is applied to the coupling structure whether it be derived from an external source or from the beam itself.

Figure 2:
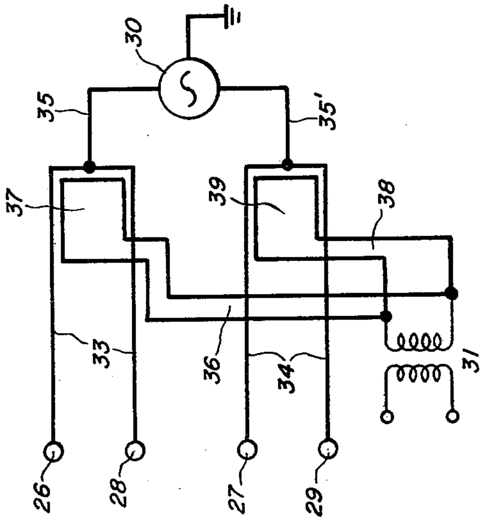
FIGURE 2 represents an arrangement for coupling both a pumping signal generator and a signal circuit to the combined signal coupler and modulation expander incorporated in the structure of FIGURE 1.

Consideration will be given initially to the coupling network for connecting pump signal source 30 to both pairs of conductors of structure 25. The terminals of those conductors are represented in FIGURE 2 by reference numerals 26 to 29, paired in the manner of the physical arrangement of those conductors. That is to say, conductors 26 and 28 are paired since they are space opposed on opposite sides of path 11 while conductors 27 and 29 are similarly paired, being likewise arranged in space-opposed relation and being in space quadrature with conductor pair 26, 28. To establish the desired symmetrical quadrupole field, conductor pair 26, 28 is connected to one terminal of source 30 and conductor pair 27, 29 is connected to the other terminal thereof in a balanced arrangement. The connection to conductor pair 26, 28 is by means of a transmission line section 33 which is short-circuited at one end and coupled at its opposite end to conductors 26, 28. Connection 35 extends from the short-circuited termination of line section 33 to one terminal of pump source 30. Conductor pair 27, 29 is connected through a similar transmission line section 34 and a connection 35' to the opposite terminal of source 30. In most cases, the structure represented is operated at a pump frequency that is approximately twice the signal of the frequency to be amplified and transmission line sections 33, 34 individually have an effective electrical length equal to one-half the wave length of the pumping frequency and, therefore, are approximately one-quarter wave length at the signal frequency.

The coupling from signal circuit 31 to structure 25 is through one or both of transmission line sections 33, 34 depending upon the degree of coupling desired with the electron beam. For example, signal circuit 31 may be extended through a transmission line 36 and a coupling loop 37 to transmission line section 33 leading to conductor pair 26, 28. It may alternatively or, if desired, additionally be coupled through another transmission line 38 and a coupling loop 39 to transmission line section 34 leading to the alternate conductor pair 27, 29. Moreover, by adjusting the relative lengths of transmission lines 36, 38 maximum coupling to the beam may be achieved in the manner to be described hereinafter.

In explaining the operation of the described structure, it will be considered initially that the single coupling loop 37 is employed to extend a connection from signal circuit 31 to conductor pair 26, 28 of structure 25 and it will further be assumed that the strength of the focus field established by solenoid 14 has been adjusted for an electron-resonance or cyclotron frequency that is equal to the frequency of the signal supplied by source 22. For the assumed conditions, an electron beam issuing from source 10 is projected along path 11 in the direction of collector 13. As the beam enters the field of influence of input modulator or coupler 20, 21 there is an exchange of energy between the modulator and the beam. Specifically, the signal desired to be amplified is applied to deflectors 20, 21 to establish a transverse dipole field across the beam path to accomplish deflection modulation of the beam and thereby impose the signal from source 22 on the electron stream. Actually, and as explained in the aforementioned application, this deflection modulation results in establishing orbital motion of the electrons in accordance with the signal to be amplified. Concurrently, however, fast wave noise and any other fast wave signal components carried on the beam into the field of coupler 20, 21 are given up by the beam to the modulator. In other words, two energy transfers are occasioned: (1) the transfer of desired signal energy from source 22 to the beam and (2) a purging of fast wave noise and any other fast wave signal components from the beam by modulator 20, 21. As the beam thus modulated by the desired signal leaves the input coupler, it enters a symmetrical quadrupole field established by structure 25 under the influence of pump signal source 30. This is a time-variable non-homogeneous field, varying at the pumping frequency and expanding the orbital motion of the electrons in the manner described in the aforementioned application. It is this expansion of the electron motion which achieves signal amplification. At the same time, conductors 26, 28 of structure 25 performs the reciprocal function of input coupler 20, 21 and extract the amplified signal energy from the beam for application to load 31.

Figure 3C:
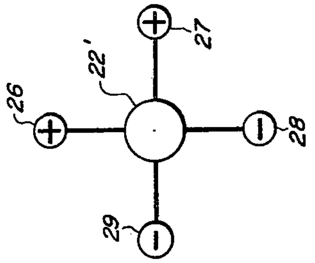
FIGURES 3*a–c* are symbolic representations of coupling connections made to the combined coupler and modulation expander.
Figure 3B:
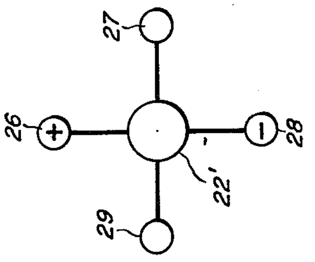
Figure 3A:
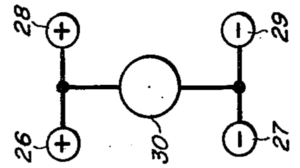

The instantaneous potentials of the several conductors of structure 25 for the assumed conditions are depicted in FIGURES 3*a* and *b*. Conductor pair 26, 28 are instantaneously positive and the remaining conductor pair 27, 29 are instantaneously negative in respect to the pumping signal supplied by source 30. This excitation might be referred to as excitation in the $\pi$ mode. It develops a non-homogeneous, symmetrical quadrupole field and, under the conditions outlined in the aforementioned application, accomplishes modulation expansion with the required energy being supplied by pump source 30. With respect to the signal delivered by the amplifier, the instantaneous potential conditions may cause conductor 26 to be positive and its companion conductor 28 to be negative while conductors 27, 29 constituting the other pair of structure 25 are maintained at a reference or zero potential as represented in FIGURE 3*b* where, for convenience, the amplified signal is indicated as being supplied by a source 22'. This may be characterized as a $\pi/2$ mode type of excitation which results in a dipole field establishing the necessary coupling of the demodulator and electron beam to deliver the amplified signal energy to the signal circuit or load 31. At the same time, the signal circuit is isolated from pump source 30. This results from the fact that transmission line sections 33, 34 are one-half wave length sections at the pump frequency. The short-circuited end of each section represents a voltage minimum and therefore there is a minimum or zero voltage at the pumping frequency between the conductors of pair 26, 28 and between the conductors of pair 27, 29. Consequently, the dipole field which establishes the necessary coupling between the beam and the output demodulator represents the amplified signal rather than the pump signal.

Considering transmission line sections 33, 34 in terms of the signal frequency, it is apparent that they function as impedance transformers, transforming between a voltage maximum at the signal frequency represented by the end connected to conductors 26, 28 or 27, 29 as the case may be and a current maximum at the opposite end. To have this impedance transforming effect, each transmission line section 33, 34 should have a low characteristic impedance relative to the resistance appearing across conductor pair 26, 28 and conductor pair 27, 29 in response to the loading of these pairs by the electron beam. The characteristic impedance of each line section 33, 34 is proportioned in accordance with the following expression:

$$Z_0^2 = R_1 . R_2$$

where $Z_0$ is the characteristic impedance, $R_1$ is the load impedance at one terminal of the line section and $R_2$ is the source impedance at the opposite terminal.

The operation has been thus far described on the premise that only one coupling loop 37 or 39 is employed in coupling signal circuit 31 to signal structure 25. If the second loop 39 is also employed, the instantaneous potential pattern of FIGURE 3*c* may be produced in respect of the amplified signal, again designated as supplied by a source 22'. In this case, conductors 26 and 27 have the same potential and conductors 28, 29 are of like potential but opposite in polarity to that of conductors 26, 27. The dipole field in this case is the vectorial addition of two dipole components, one established by conductors 26, 28 and the others by conductors 27, 29. The coupling of signal circuit 31 to the electron beam is now greater than for the condition of FIGURE 3*b* by a factor equal to the square root of 2. Still greater coupling may be attained by having transmission lines 36, 38 of different lengths. If one is a quarter wave longer than the other, introducing a 90 degree phase shift, the coupling may be twice that of the arrangement of FIGURE 3*b* so long as the phase shift is in the appropriate sense to cooperate with the sense of the orbital electron motion. In other words, the dipole field between conductors 27, 29 is in phase quadrature to the dipole field between conductors 26, 28. The addition of 90 degrees phase shift in the proper sense between the two fields permits the dipole effects to add arithmetically.

FIGURE 2 represents a coupling arrangement in which loops 37, 39 are arranged in parallel. They may also be arranged in series if desired.

Structure 25 serves both as a modulation expander and demodulator or output coupler in the quadrupole parametric amplifier. This is a simplified structure combining a modulation expander with a coupling device while preserving the desired stability of the amplifier. Very similar results may be attained if the modulation expander is combined with the input coupler in which case the demodulator or output coupler is, preferably, a separate structure to avoid feedback.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a transverse-mode parametric amplifier of the quadrupole type, a combined signal coupler and modulation expander comprising: a transmission line disposed coaxially of an electron beam path and including four conductors arranged in two mutually perpendicular pairs; means, including a signal circuit coupled to at least two of said conductors, for establishing a transverse dipole field across said beam path in response to signal energy transferred between said beam and said signal circuit; and further means, including a pump signal source coupled to both of said pairs of conductors, for establishing a symmetrical quadrupole field about said beam path in response to a pumping signal applied from said pump signal source.

2. In a transverse-mode parametric amplifier of the quadrupole type, a combined signal coupler and modulation expander comprising: a transmission line disposed coaxially of an electron beam path and including four conductors arranged in two mutually perpendicular pairs; means, including a signal circuit coupled to said four conductors, for establishing a transverse dipole field across said beam path in response to signal energy transferred between said beam and said signal circuit; and further means, including a pump signal source coupled to both of said pairs of conductors, for establishing a symmetrical quadrupole field about said beam path in response to a pumping signal applied from said pump signal source.

3. In a transverse-mode parametric amplifier of the quadrupole type, a combined signal coupler and modulation expander comprising: a transmission line disposed coaxially of an electron beam path and including four conductors arranged in two mutually perpendicular pairs; means, including a signal circuit coupled to one of said pairs of conductors, for establishing a transverse dipole field across said beam path in response to signal energy transferred between said beam and said signal circuit; and further means, including a pump signal source coupled to both of said pairs of conductors, for establishing a symmetrical quadrupole field about said beam path in response to a pumping signal applied from said pump signal source.

4. A transverse-mode parametric amplifier for amplifying signals of a particular frequency comprising: a transmission line disposed coaxially of an electron beam path and including four conductors arranged in two mutually perpendicular pairs; a signal circuit; a pump signal source; a coupling network connecting said pump source in balanced relation to both of said pairs of conductors to establish a symmetrical quadrupole field about said beam path and also completing a signal path from at least two of said conductors to said signal circuit while effectively isolating said circuit from said pump source.

5. A transverse-mode parametric amplifier for amplifying signals of a particular frequency comprising: a transmission line disposed coaxially of an electron beam path and including four conductors arranged in two mutually perpendicular pairs; a signal circuit; a pump signal source; a coupling network connecting said pump source in balanced relation to both of said pairs of conductors to establish a symmetrical quadrupole field about said beam paths; and means, including said coupling network, for completing a signal path from each of said pairs of conductors to said signal circuit while effectively isolating said circuit from said pump source, one of said paths being effectively a quarter wave longer than the other at the signal frequency.

6. A transverse-mode parametric amplifier for amplifying signals of a particular frequency comprising: a transmission line disposed coaxially of an electron beam path and including four conductors arranged in two mutually perpendicular pairs; a signal circuit; a source of a pump signal having a frequency approximately twice that of said signal frequency; a pair of transmission lines short circuited at one end and connected at the opposite end to a respective one of said pairs of conductors, each line having an electrical length of one quarter wave length at said signal frequency; means for connecting said pump source in balanced relation to the short-circuited ends of said lines to establish a symmetrical quadrupole field about said beam path; and means for coupling said signal circuit through one of said lines to one of said pairs of conductors while isolating said circuit from said pump source.

References Cited in the file of this patent

UNITED STATES PATENTS

| | | |
|---|---|---|
| 2,925,523 | Weibel | Feb. 16, 1960 |
| 2,940,006 | Cuccia | June 7, 1960 |
| 2,959,740 | Adler | Nov. 8, 1960 |

OTHER REFERENCES

Robert Adler: Parametric Amplification of the Fast Electron Wave, Proc. of the I.R.E.; vol. 46, June 1958, pages 1300–1301.

Adler et al.: A Low-Noise Electron-Beam Parametric Amplifier, Proc. of the I.R.E.; vol. 46, October 1958, pages 1756–1757.